(12) United States Patent
Nitidharmatut et al.

(10) Patent No.: US 10,904,382 B2
(45) Date of Patent: *Jan. 26, 2021

(54) SIMULTANEOUS VOICE AND DATA CONTENT DRIVEN COMMERCIAL DATA PLATFORM

(71) Applicants: Trysit Nitidharmatut, Bangkok (TH); Timothy Maslyn, Cupertino, CA (US); Vira Intanate, Samutprakarn (TH)

(72) Inventors: Trysit Nitidharmatut, Bangkok (TH); Timothy Maslyn, Cupertino, CA (US); Vira Intanate, Samutprakarn (TH)

(*) Notice: Subject to any disclaimer, the term of this patent is extended or adjusted under 35 U.S.C. 154(b) by 0 days.

This patent is subject to a terminal disclaimer.

(21) Appl. No.: 16/730,882

(22) Filed: Dec. 30, 2019

(65) Prior Publication Data

US 2020/0137225 A1   Apr. 30, 2020

Related U.S. Application Data

(63) Continuation of application No. 16/176,113, filed on Oct. 31, 2018.
(Continued)

(51) Int. Cl.
*H04M 3/00* (2006.01)
*H04M 3/42* (2006.01)
(Continued)

(52) U.S. Cl.
CPC .......... *H04M 3/4211* (2013.01); *G06F 16/27* (2019.01); *G06F 16/3329* (2019.01);
(Continued)

(58) Field of Classification Search
CPC .......... H04M 3/4211; H04M 2203/252; G06F 16/27
(Continued)

(56) References Cited

U.S. PATENT DOCUMENTS

| 5,544,231 A | 8/1996 | Cho |
| 6,327,343 B1 | 12/2001 | Epstein et al. |
| (Continued) | | |

FOREIGN PATENT DOCUMENTS

WO   2016085258 A1   6/2016

OTHER PUBLICATIONS

International Search Report and Written Opinion from International Application No. PCT/US2018/061450 dated Feb. 7, 2019, 11 pages.
(Continued)

*Primary Examiner* — William J Deane, Jr.
(74) *Attorney, Agent, or Firm* — Daylight Law, P.C.

(57) ABSTRACT

Methods and systems are disclosed that facilitate a commercial data platform that enhances the interaction between a dialer and receiver during a voice call by simultaneously delivering and tracking data content that promotes ongoing commerce and interactions between these parties. One such system includes first and second interaction managers on a dialer device and a receiver device that transmit first and second sets of interaction data to a database during a call. A server obtains receiver content data from the database using the receiver identifier, transmits the receiver content data to the dialer device, obtains dialer content data from the database using the dialer identifier, transmits the dialer content data to the receiver device, and stores data from both the first set of ID and the second set of ID in the database in association with both the receiver identifier and the dialer identifier.

20 Claims, 7 Drawing Sheets

Related U.S. Application Data (60) Provisional application No. 62/611,690, filed on Dec. 29, 2017.

(51) Int. Cl.

| | | |
|---|---|---|
| *G06Q 20/06* | (2012.01) |
| *G06F 16/27* | (2019.01) |
| *G06Q 30/06* | (2012.01) |
| *G06Q 30/02* | (2012.01) |
| *G06Q 20/16* | (2012.01) |
| *G06F 16/332* | (2019.01) |
| *H04M 3/487* | (2006.01) |
| *H04M 7/00* | (2006.01) |

(52) U.S. Cl.
CPC ......... *G06Q 20/0655* (2013.01); *G06Q 20/16* (2013.01); *G06Q 30/0251* (2013.01); *G06Q 30/0641* (2013.01); *H04M 3/42068* (2013.01); *H04M 3/4878* (2013.01); *H04M 7/0036* (2013.01); *H04M 2203/252* (2013.01)

(58) Field of Classification Search
USPC ........................................ 379/207.13, 207.01
See application file for complete search history.

(56) References Cited

U.S. PATENT DOCUMENTS

| | | |
|---|---|---|
| 6,987,841 B1 | 1/2006 | Byers et al. |
| 7,277,445 B2 | 10/2007 | Bartfeld et al. |
| 7,379,881 B2 | 5/2008 | Smithies et al. |
| 7,418,090 B2 | 8/2008 | Reding et al. |
| 8,036,355 B2 | 10/2011 | Velarde |
| 8,107,613 B2 | 1/2012 | Gumbula |
| 8,320,536 B2 | 11/2012 | Portman et al. |
| 8,335,299 B1 | 12/2012 | Crandall et al. |
| 8,428,559 B2 | 4/2013 | Silva |
| 8,510,116 B1 | 8/2013 | Moy et al. |
| 8,675,638 B2 | 3/2014 | Croak et al. |
| 8,687,786 B2 | 4/2014 | Chiczewski et al. |
| 8,897,428 B2 | 11/2014 | Walker et al. |
| 2002/0152142 A1 | 10/2002 | Schellmann et al. |
| 2002/0168967 A1 | 11/2002 | Clapper |
| 2003/0220835 A1 | 11/2003 | Barnes |
| 2005/0125342 A1 | 6/2005 | Schiff |
| 2005/0286708 A1 | 12/2005 | Slosberg et al. |
| 2006/0056599 A1 | 3/2006 | Cragun |
| 2006/0285662 A1 | 12/2006 | Yin |
| 2007/0135101 A1 | 6/2007 | Ramati |
| 2007/0269025 A1 | 11/2007 | Shieh |
| 2009/0086010 A1 | 4/2009 | Tiphane |
| 2012/0257002 A1 | 10/2012 | Stocker |
| 2013/0035054 A1 | 2/2013 | Ashton |
| 2014/0254437 A1 | 9/2014 | Koch |
| 2015/0149290 A1 | 5/2015 | Ashton |
| 2016/0119477 A1 | 4/2016 | Sharpe et al. |
| 2017/0013129 A1 | 1/2017 | Rotsztein |
| 2017/0192735 A1 | 7/2017 | Faran |

OTHER PUBLICATIONS

Notice of Allowance dated Mar. 20, 2020 from U.S. Appl. No. 16/176,113, 12 pages.

Nonfinal Office Action dated Oct. 6, 2020 from U.S. Appl. No. 15/931,447, 21 pages.

SIMULTANEOUS VOICE AND DATA CONTENT DRIVEN COMMERCIAL DATA PLATFORM

CROSS REFERENCE TO RELATED APPLICATIONS

This application is a continuation-in-part of U.S. patent application Ser. No. 16/176,113, filed Oct. 31, 2018, which claims priority to U.S. Provisional Application No. 62/611,690, filed Dec. 29, 2017, both of which are incorporated by reference herein in their entirety for all purposes.

BACKGROUND

Every year of the information age bears witness to the continued development of more ways to allow people to communicate and disseminate information. However, person-to-person voice communication over a telephone remains one of the most effective and preferred ways for people to communicate. Even when people use the Internet to search, they often follow up their search with a phone call. Indeed, market analysts have found that 48% of local mobile web searches end with a telephone call. Furthermore, inbound telephone calls are rated as the highest quality form of sales leads because people will only tend to call a business when they are almost ready to make a purchase for goods or service. Telephone calls therefore represent a high value potential sales channel for businesses and a high value information channel for individuals.

Despite the high value of the information generated by voice interactions for both customers and businesses, the useful data associated with a voice interaction is generally lost once a call is concluded. This is particularly true for individuals and small businesses who can't afford enterprise-grade call management systems. Furthermore, for all their benefits, voice interactions can fall short in certain tasks where visible communication, augmented by simultaneously sharing data content, could be more efficient such as displaying a person's name, a restaurant order, an image of a product offering, or a credit card number to someone who is using the information to complete a transaction.

SUMMARY

This disclosure relates to a commercial data platform. The platform is based around voice communication but augments this voice communication with both the delivery and retention of valuable data regarding that voice communication. Methods and systems are disclosed that enable multiple parties to conduct real time commerce and personal interactions in a content rich and voice enabled network environment using devices that obtain content/data from, and actively write content/data to, proprietary and public web-based and cloud-based computing environments. The devices can be mobile phones with the capability to display content to their users. The same content/data is employed to enhance and personalize active and future interactions using the platform, thus providing an ecosystem for building strong, lasting, and mutually beneficial person-to-business, business-to-business, and person-to-person social relationships that further encourage and promote ongoing commerce and interactions between these parties.

Currently, when a prospective customer (dialer) dials a business (receiver) the customer will normally see only the phone number of the dialed business displayed during the entire voice call. Likewise, the business would see the phone number of the incoming caller on their device. Neither the customer nor the business currently has the opportunity during the voice call to simultaneously send data content to each other that can enrich the call experience by visually displaying information about each other, current customer needs and/or business offerings, or any information about past interactions the customer and the business may have had with each other. Methods and systems are disclosed that would provide the ability of a dialer and receiver, during the voice call itself, to share and interact with valuable data content on their respective devices that would enrich the calling experience for both parties and facilitate any potential transaction. This would include, for example, being able to share data content in real-time, view past interaction data, and store ongoing interactions during the call to further enhance current and future interactions between the parties. These approaches would thus bridge the gap between the current voice call, that is almost entirely void of data content related to the purpose of the call, and the modern Internet age where data content is displayed that visually enriches our experiences. Also, by storing the interactions and data content exchanged during a call, this invention provides a "memory" to both the caller and the receiver of the relationship between the parties, and would be the next best thing to having a person-to-person interaction.

This disclosure includes a system that enables a commercial data platform. The system includes a dialer device, a receiver device, a dialer that is programmed to initiate a call between the dialer device and the receiver device using a receiver phone number, a server, and a database. The system also includes a first interaction manager stored on the dialer device and programmed to transmit a first set of interaction data to the database during the call. The system also includes a second interaction manager stored on the receiver device and programmed to transmit a second set of interaction data to the database during the call. The server is programmed to obtain receiver content data from the database using the receiver phone number and/or other unique identifier, transmit the receiver content data to the dialer device, obtain dialer content data from the database using the dialer phone number and/or other unique identifier, transmit the dialer content data to the receiver device, and store data from both the first set of interaction data and the second set of interaction data in the database in association with both the receiver phone number and/or other unique identifier and the dialer phone number and/or other unique identifier. As used herein and in the appended claims the term "identifier" includes both a phone number or other unique identifier.

The simultaneous voice and data content driven commercial data platforms disclosed herein effectively enable a relationship manager for consumers using the simultaneous voice and data content driven commercial data platforms, thereby putting them on the same footing as large enterprises with complex relationship management software and data mining. However, using the simultaneous voice and data content driven commercial data platforms disclosed herein the consumers are able to manage their relationships with various vendors and keep track of their overall commercial endeavors on a massive scale with almost no effort required on their part besides the use of an effective communication channel with those vendors. Indeed, the simultaneous voice and data content driven commercial data platforms disclosed herein enable additional features above and beyond those offered by enterprise-grade customer relationship managers and should instead be referred to as commercial relationship managers owing to the fact that they allow for management of commercial data on both the consumer and the vendor side of a relationship. As such, the term CRM is used herein to refer to the ability of a platform to manage commercial relationships generally, and not just consumer relationships.

As mentioned previously, the simultaneous voice and data content driven commercial data platforms disclosed herein allow for the usage of CRMs on both the consumer and the vendor side of a relationship, and they do so by facilitating an effective communication channel between the consumer and the vendor. Rather than simply providing a flat, blank, call screen, some of the approaches disclosed herein add a visual layer of communication to a standard voice communication. In the approaches disclosed herein in which the consumer and/or vendor are communicating using smartphones with display screens, the commercial data platform allows for the display of information on the screen of the device during the call. The screen can be used to display information about the vendor's establishment and offerings generally, the specific good or service that is the object of the current call, the past relationships of the consumer and vendor, and any other information that can facilitate an effective interaction between the consumer and vendor for purposes of building trust and improving their business relationship.

Numerous specific examples of the above-mentioned features are provided in the detailed description below. However, to illustrate the two-fold benefit of the disclosed simultaneous voice and data content driven commercial data platforms consider the situation in which a consumer's options for a pizza order are displayed on the screen of a phone during a voice call. The display of the options enhances the consumer's selection process because the images of the pizza can be curated by the vendor to make them look appealing and to provide information that spoken words alone cannot. The inclusion of a visible channel of communication also prevents miscommunications regarding the content of the order because the order can be displayed visibly to the consumer and vendor at the same time. Numerous other benefits from a communication perspective are provided in terms of the presentation of information using the visible channel provided by the platform. In addition, the fact that this information was provided to the user via the simultaneous voice and data content driven commercial data platform allows the information to be stored for later use. The next time the consumer calls that vendor, their prior order will be available for presentation on the display or reordering in an ultra-convenient fashion. Any incentives or coupons earned based on continued patronage can also be tracked using the data. Furthermore, the history of interactions can be used by the vendor to provide the level of attention and valued respect that a repeat customer is due, or to suggest additional offerings that may be appealing to a given consumer. Therefore, just by allowing the consumer and vendor to use the platform to share images of a pizza, and the receipt of an order for that pizza, a large number of opportunities arise for enriching the commercial relationship of the consumer and vendor.

The benefits of the CRMs described above are not restricted to large enterprises. Using the simultaneous voice and data content driven commercial data platform disclosed herein, small business and individuals are able to obtain the same access to valuable commercial interaction data for commerce enrichment. The devices used by users of the platform can include basic personal computers with built-in phone dialers, smartphones, smart devices such as voice controlled household assistants with or without integrated screens, wearables with dialer connectivity, and any other device that can be used to both make a phone or voice call through VoIP messaging applications or otherwise, and present interaction data to a user. Indeed, in certain approaches, only one of the users needs access to the interaction data, and the other user can be connected only indirectly to the platform through the other user. In these examples, one user could be utilizing a basic telephone and interaction data could be sent from the other user's device to the platform. For example, one user could be operating a smartphone and inputting data to the platform using an application on their device while speaking to a user operating a basic telephone. Furthermore, although the system benefits from situations in which both users have devices that can provide voice and data to the platform, the system does not require both users to have access to the same type of devices.

The data mined, and further processed with artificial intelligence and machine learning, from usage of the simultaneous voice and data content driven commercial data platform can also be used by a large number of vendors to facilitate an entire business network and ecosystem based around the platform. For example, vendors offering complementary services can offer incentives and promotions to a user based on knowledge regarding that customer's consumption of complementary goods and services. The vendors could team up to share the cost of these incentives in exchange for an increase in customer consumption across all categories. The data could also be used to facilitate a liquid platform-centric currency offered to consumers using the commercial data platform either by the platform administrator or by vendors using the platform. The platform could track usage of the currency as it was used in user-to-user transactions on the platform. Aside from offering promotions, knowledge of a particular consumer's consumption patterns could be beneficial in terms of offering a high value potential client the attention and respect they are due even if a particular vendor had no prior interactions with that client and would not have otherwise known that they represented a high value potential business relationship. The data mined and further processed with artificial intelligence and machine learning, could also be used by consumers to obtain recommendations for or from vendors of particular goods and services that have been consumed by other consumers using the platform with high volume or regularity. The data mined, and further processed with artificial intelligence and machine learning, could also be synthesized to provide users with information regarding the broader impact of their commercial decisions. For example, the data could be used to show how commercial transactions with a potential vendor impact a local economy vs. the broader economy, tend to lead towards income inequality across society as a whole, lead to a reduction in social good (e.g., environmental harm, support of unacceptable working conditions), result in political contributions to political groups with interests adverse to those of the purchaser, etc. More specific examples of these benefits and how the mined data can be utilized are provided in the detailed description below.

DETAILED DESCRIPTION

The following is a detailed description of systems and methods for facilitating simultaneous voice and data content driven commercial data platforms, followed by a description of the various functionalities that are enabled by such simultaneous voice and data content driven commercial data platforms. These examples are non-limiting and are provided for illustrative purposes. For example, numerous examples in this description are limited to cases where both parties to a conversation are utilizing smartphones or other mobile devices, but the platforms described herein function regardless of what kinds of devices are being used to access them. Furthermore, numerous examples in this description are limited to cases where two parties are using the platform in combination with a data channel as well as a voice channel. However, the approaches disclosed herein provide certain beneficial functions regardless of whether only one party is connected to the platform via a data channel or the voice channel. For example, one party could only have access to a voice channel and indirectly provide data to the platform via the other user's device. As another example, one party might not be connected via a voice channel and might only be accessible via the data channel. Specifically, a vendor may set up an IVR system to handle all incoming traffic calls by routing the device to the data channel without ever establishing a voice channel.

Figure 1:
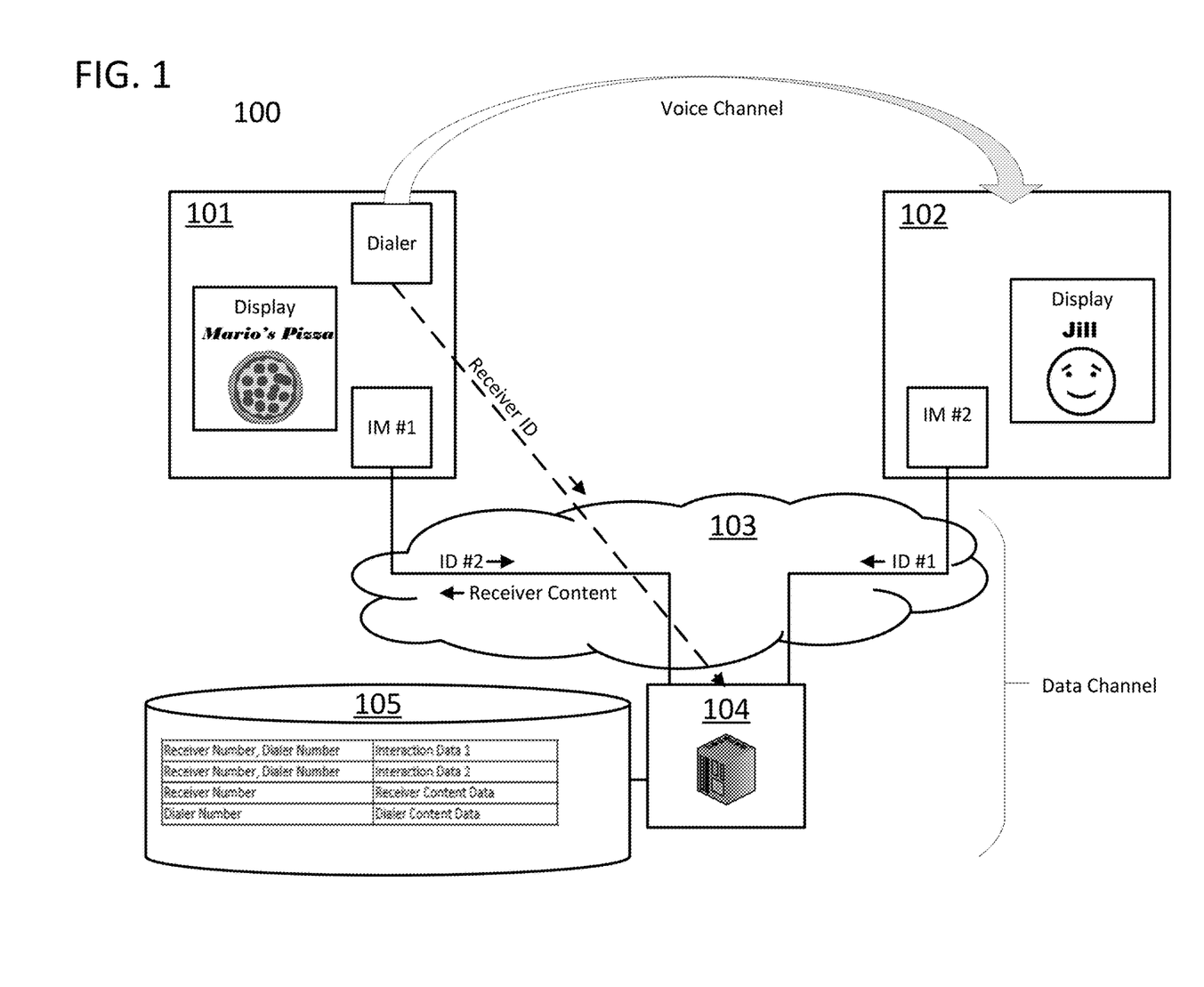
FIG. 1 illustrates a commercial data platform system for a call between a dialer device and a receiver device to facilitate a simultaneous transfer of voice and data content in accordance with specific embodiments of the present invention.

FIG. 1 illustrates a system 100 that can be used to facilitate a simultaneous voice and data content driven commercial data platform. The system 100 is based around a dialer device 101 and a receiver device 102. In certain approaches, the dialer device 101 and receiver device 102 will be connected via both a voice channel and a data channel. The voice channel can be a standard voice call connected between the two devices and facilitated by a circuit-switched network. However, any voice connection between the two devices can be utilized such as an IP phone connection facilitated by a packet-switched network 103. The packet-switched network 103 can utilize VoIP or other protocols. The data channel can be a packet-switched network 103 and can include a server 104 and a database 105 administrated by the platform. The network could include the Internet. The dialer and receiver devices can be any devices capable of supporting a voice call. Although the simultaneous voice and data content driven commercial data platform can function with users that are using separate devices for accessing the voice and data channels, in the system illustrated by FIG. 1, both users are using devices that can access both. For example, the devices may be smartphones that are able to support a voice based telephone call while also accessing the platform via a data connection such as via the Internet. The data channel could be accessed by an interface presented on a touch screen of the smartphones that are displayed during the call. The data channel interface could be shown alongside a dialer application and be provided by a separate application, or the dialer application could include an integrated window for the data channel interface. The data channel interface could be a screen overwrite, or screen overlay, inside, as part of, or on the dialer application screen normally unused and unchanging during the call duration, for the data channel interface. The devices could also be personal computers, wearables, standard telephones, or platform specific terminals. The users in the illustrated situation are a consumer by the name of Jill Smith and a vendor by the name of Mario's Pizza. However, the platform can also be used to facilitate peer-to-peer and business-to-business communication.

The dialer device includes a dialer that is programmed to initiate a call between the dialer and the receiver device using a receiver phone number and/or other unique identifier. The dialer device can receive commands from a user using a traditional keyboard, auditory inputs such as voice via a microphone, touch inputs via a touch screen, gestures detected by an optical or non-visible light sensor, and any other means for providing user input. The dialer can be an application on a smartphone or a computer. The application could be the built-in dialer of a computing device, such as a smartphone, as developed by the developer of the operating system on the computing device. Alternatively, the application could be developed by the platform and include multiple functionalities in addition to serving as a phone dialer for establishing a phone call such as providing access to the data channel described herein. Alternatively, the application could be integrated with a third-party application such as a social networking application configured to allow the formulation of a voice channel between two parties using a receiver phone number and/or other unique identifier associated with one of those parties. The dialer can receive the receiver phone number and/or other unique identifier via a voice command, the selection of a hyperlink, the manual entry of a phone number and/or other unique identifier, scanning a QR code, or any other method for providing numbers to an application. The dialer can also be an application on a traditional electronic telephone that has been augmented for use with the platform. The dialer application can set up a voice call via a traditional circuit-switched network or via a packet-switched network such as via voice over Internet Protocol (VoIP). In any of these situations, and regardless of how the dialer initiates the call between the dialer and the receiver device, the receiver phone number and/or other unique identifier will be intercepted for use by the platform. Various approaches for intercepting the receiver phone number and/or other unique identifier are described in more detail below.

The commercial data platform also includes a server and a database. As illustrated, in FIG. 1, the server and the database can be connected to the dialer device and the receiver device through a network. The network can be a packet-switched network. The network can be the Internet. A data channel between the receiver device and dialer device can be supported by software on the receiver device and dialer device, the network, the server, and the database. The data channel can be supported by a first interaction manager (IM) stored on the dialer device and a second interaction manager (IM) stored on the receiver device. The interaction manager on the dialer device can be programmed to transmit a first set of interaction data (ID) to the database during the call. The interaction manager on the receiver device can be programmed to transmit a second set of interaction data (ID) to the database during the call. In approaches in which the devices include applications developed and provided by the platform, the interaction managers could be included in those applications. In the specific case of a smartphone with an application provided by the platform, the interaction managers could be part of the same application as the dialer on the dialer device.

The server and database can be part of a cloud-based platform. The server can be any system of software and suitable computer hardware that is capable of responding to requests across a network to provide a network service. Although the server is illustrated as a single unit of physical hardware, the server may comprise multiple physical hardware units. The physical hardware units can include personal computers, workstation, and dedicated enterprise server blades. The physical hardware units can be in a single physical location such as an office or data center, but they may also be located at separate data centers or offices. The server can be a virtualized server. Individual network services can be provided by individual servers or multiple servers, as well as individual units of physical hardware or multiple units of physical hardware. As the term server is used to describe a system that provides multiple network services in certain portions of this disclosure, it is implied that the multiple network services are not necessarily being supplied by a single unit of physical hardware. The database can be a proprietary database and have a data model that is in accordance with the detailed description below. This data model is exemplary, and more complex data models can be used with hundreds of tables with different keys to access the data. The database can be a relational or non-relational (e.g., NoSQL) database or any other database technology supporting high-speed real-time inserts, updates, and reads.

Figure 2:
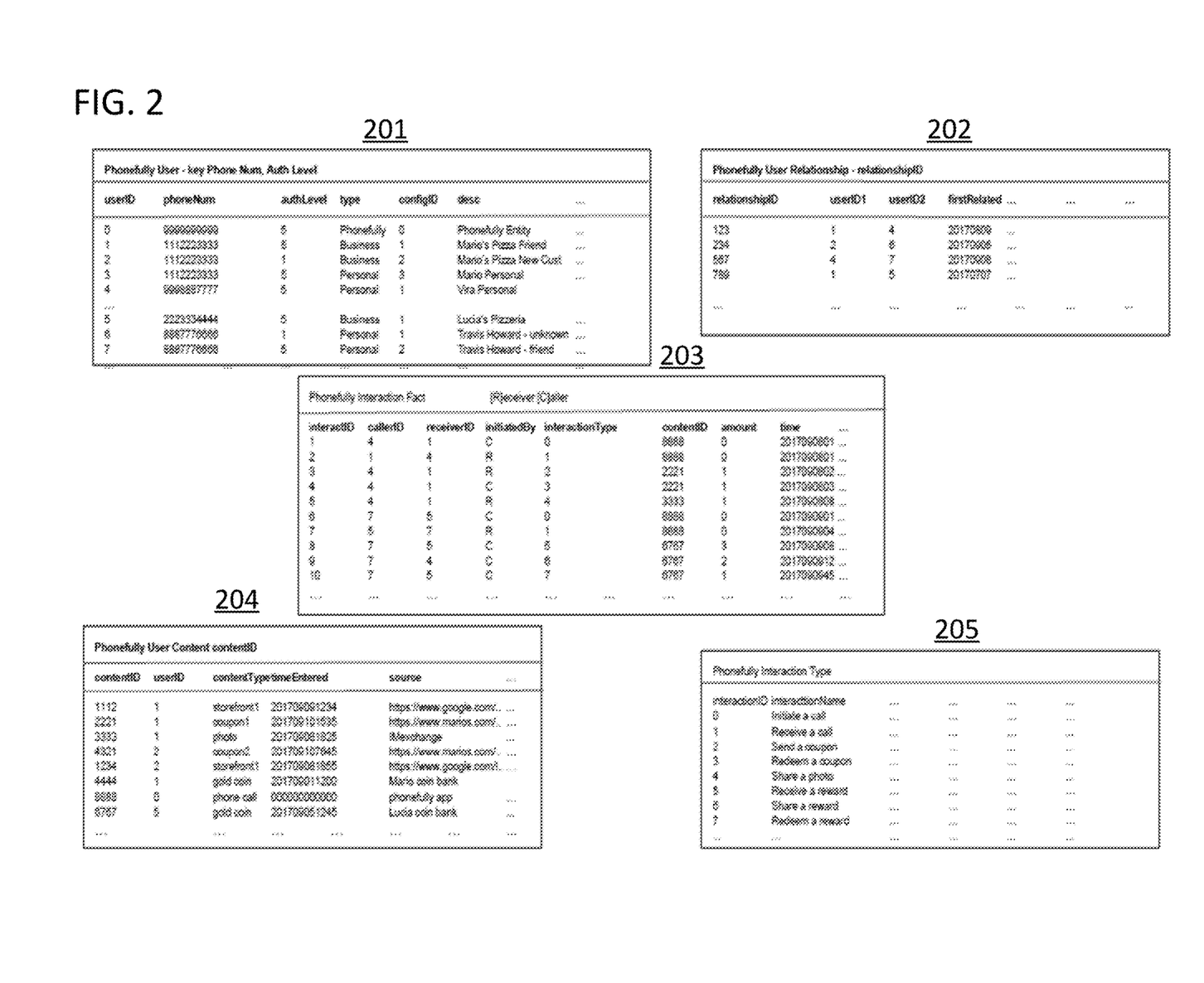
FIG. 2 provides data tables that can be instantiated by a database for a data model of a commercial data platform in accordance with specific embodiments of the present invention. The tables shown are non-limiting and for illustrative purposes.

The data model of the commercial data platform can include multiple data tables instantiated by the database. The tables can include a user identity table, a user relationship table, a content table, an interaction type table, and an interaction fact table. FIG. 2 provides an example data model for a commercial data platform that includes tables 201, 202, 203, 204, and 205. As seen, the tables can be interrelated to provide a complete record of all interactions occurring using the commercial data platform which can later be accessed and mined, and further processed with artificial intelligence, machine learning and deep learning, to provide both consumers and vendors with rich data to enhance their later interactions. As illustrated, interaction data between a receiver and a dialer can be stored in association with both a dialer and receiver phone number or other unique identifier. Furthermore, it should be noted that the devices in the commercial data platform will have access to third party databases such as social media databases either directly or via the database of the commercial data platform as the IM on either device will be able to request the platform to obtain information from alternative databases which would then be stored in the platform's content table. Alternatively or in combination, the platform could be configured to request content from third party databases and dynamically generate responses when the requested content from an IM is not located in the database.

The database of the commercial data platform can include receiver content, dialer content, and interaction data. This data can be accessed in numerous ways to facilitate rich interactions between a dialer and receiver that are using the platform. As illustrated in FIG. 1, once a receiver phone number or other unique identifier is sent from the dialer to the server, the server can use the receiver phone number or other unique identifier to obtain receiver content data from the database and deliver it back to the dialer device. The receiver content data can include a profile from the receiver. For example, the profile could be a company storefront with static or animated images and videos with sound advertising the vendor's offerings. The storefront could include a company name and a profile image. Alternatively, the receiver content data could include links to a set of interaction data in the database to allow the dialer to begin interacting with the receiver using the platform before the call is set up between the two devices. The receiver number can be provided to the server in any number of ways as will be described in more detail below. Once the call is established, dialer content data could be delivered to the receiver device. The dialer content data could likewise be a profile for the dialer. The profile could be a dialer profile with a user name and a profile image. Both the dialer content data and the receiver content data could be pulled directly from the database of the platform or it could be dynamically generated by the platform via access to other information sources using the Internet such as through a third-party API using either the receiver or dialer phone numbers and/or other unique identifiers. For example, if a receiver did not yet have a profile, the phone number of the receiver could be used in an internet search to obtain a name of the business, a location, and a few images of the business to produce a profile for display on the dialer device. The server can be programmed to detect an absence of profile data in order to trigger this dynamic generation of a profile.

The profile data displayed to a counterparty during an interaction using the platform can be configurable and can be specific to that counterparty's identity. For example, a user can be given the option to select images and other information to present as part of their identity. The profile can be a storefront for the user. The capability to generate this profile can involve selecting options and entering information for a template or it can involve a more flexible tool for designing the content such as a drag and drop WYSIWYG interface. The user can also configure multiple profiles for display using the system and can set different rules for who those multiple profiles are displayed to. The user could set a specific profile for commercial use and another profile for personal use. The user could set a specific profile for callers they have a history with and another profile for callers they do not have a history with. In order to determine which profile content should be delivered, the platform could utilize both the dialer's phone number and/or other unique identifier, and the receiver's phone number and/or other unique identifier. The level of customization could drop all the way down to the level of individual callers and their specific relationship and/or authentication/authorization levels. Customization at this level could be provided in an automatic fashion by the platform while allowing the users to customize the automatic storefronts even more. For example, the storefront provided by Mario's pizza to Jill Smith could be automatically set by the platform to display the last order Jill placed with Mario and the number of times that Jill has placed an order with Mario generally, but Jill could be given the option to display a customized picture to Mario when she gives him a call such as a picture she took the last time she visited his restaurant. As another example, the platform could keep track of a confidence level for each number a person could reach out to. The confidence level could continue to rise based on how much interaction had taken place using the platform between that user and the number, and whether or not those interactions were positive or not. Users could then set different profiles up to be displayed based on those confidence levels where, for example, personal information was held back from being displayed if a confidence level was too low. As another example, the displayed information shown on the profiles could also include an assigned valuation of the relationship with the counterparty to the call. The assigned valuation could be generated dynamically by the platform based on the accumulated data stored therein from prior interactions between the parties to the call. More specifically, and returning to the call between Jill and Mario, the data in the platform could be used to generate and display a grade of "A+" to Mario to remind him that Jill is a repeat customer that should be treated with extra care and attention.

Figure 3:
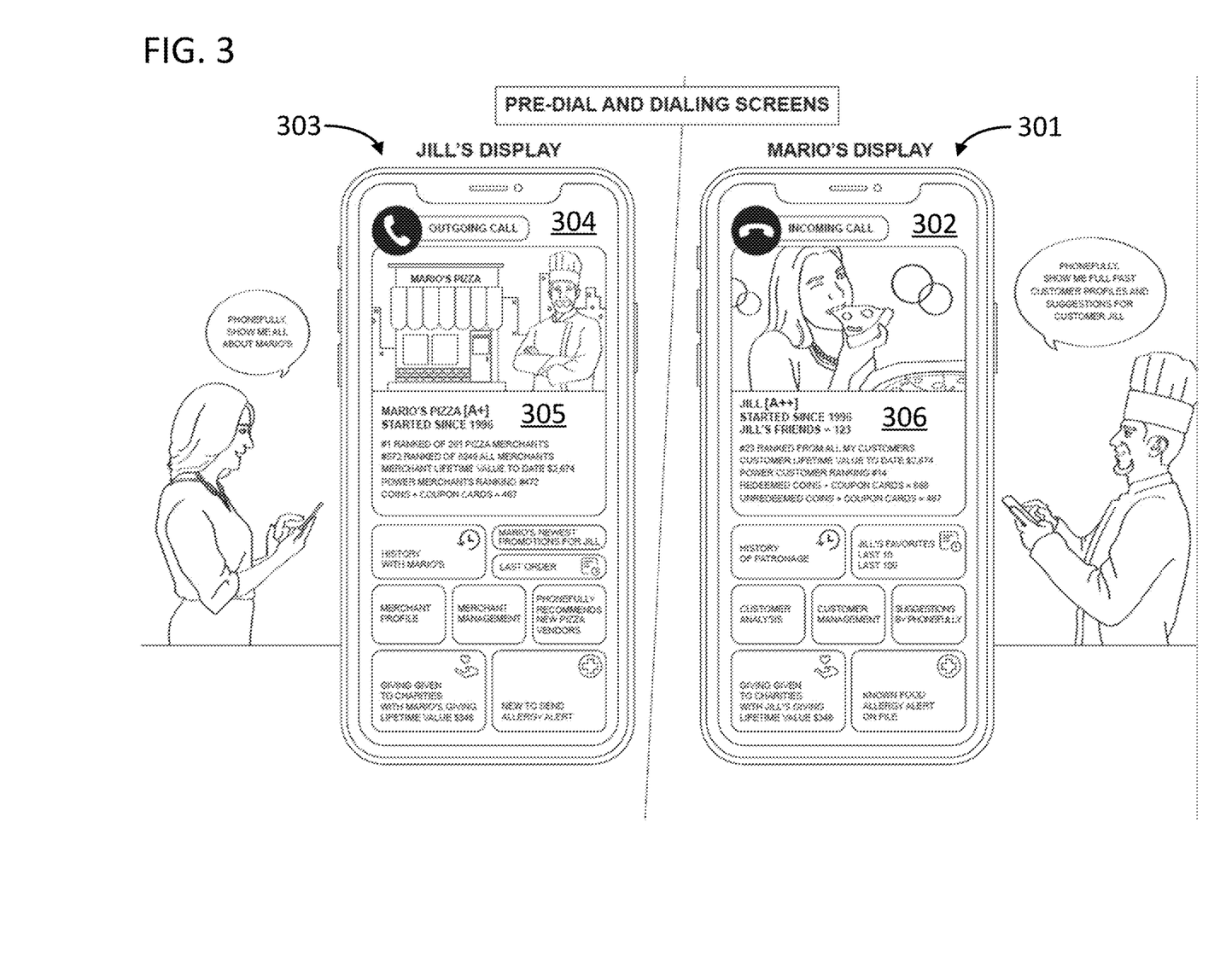
FIG. 3 illustrates a dialer device with a dialer display and a receiver device with a receiver display, displaying information before and during dialing, and after the devices have received content from a server in accordance with specific embodiments of the present invention.

FIG. 3 illustrates a specific example of a dialer device 303 with a dialer display 304 and a receiver device 301 with a receiver display 302 displaying information before and during dialing, and after the server 104 has delivered receiver content and dialer content to the respective devices as shown in FIG. 1. As seen, the profiles delivered to each of the devices are specific to both the receiver and the dialer. In this situation, the profiles delivered to each of the users, for example Mario's profile 305 and Jill's profile 306, have also been curated by either the platform or the individual users to reflect the relationship that has already been established between the users. This illustration also provides an example of how the commercial data platform can generate data for display using prior interaction data. In each of the displays 302 and 304, the counterparty has been assigned a ranking in terms of how often prior interactions have occurred to generate a label of "A+" which reminds the user of the value they should place on their relationship with the counterparty.

The manner in which interaction data is obtained for usage by the platform can also be described with reference to FIG. 1. Interaction data can be provided to and from the dialer and receiver devices to the server of the commercial data platform using interaction manager software stored on the device. The interaction manager will request information from the database and receive information from the database. It may also receive information from external databases that are accessed by the server. The interaction manager can receive data that is pushed from the database without a request being sent. As such, the software that facilitates interactions between the two devices along the data channel of the platform can be spread out amongst the server, the dialer device, and the receiver device. The first and second interaction managers can be programmed to transmit a first and second set of interaction data to the database during a call between the dialer device and the receiver device. The interaction data can be stored in the database for later use. The interaction data can be any data relating to the interaction between the dialer and the receiver during the call. For example, the second set of interaction data can involve a menu pushed from the receiver to the dialer through the data channel, and the first set of interaction data could include a selection of an item on that menu by the dialer. In these situations, the interaction data is being stored in the database and is also being passed through the platform from one device to the other to facilitate the current interaction between the devices such that the server and database are serving as part of the data channel between the two devices. For example, the interaction data sent from a vendor-receiver to a consumer-dialer could be a sales offer, while the interaction data sent back from the consumer-dialer to the vendor-receiver could be a purchase order generated in response to that offer. Any commercial interaction could be facilitated through this data channel via the transmission of various types of data. In keeping with the prior example, the interaction could continue with additional interaction data in the form of a receipt sent from vendor-receiver to the consumer-dialer. The data would be both channeled through the platform and stored by the platform for later use. The interaction data can also include information that is not provided from one device to the other such as payment information provided by the dialer device to the platform for forwarding to a payment processor. Even though the payment information is not provided to the receiver device it can still be referred to as interaction data herein because it relates to the interaction between the dialer and the receiver and it is ultimately provided to one of the devices.

The interaction data provided during the call can be a subset of the interaction data pushed by each of the devices to the server. The interaction data that is sent between the devices can facilitate a high-level of interaction between the receiver and the dialer. In certain approaches, the data channel of the commercial data platform will serve as a virtual table top to allow for the dialer and receiver to collaborate, and the interaction data sent during the call will be represented on this table top. The interaction data exchanged between the dialer and receiver is saved in a database and is, in turn, made available to enrich the current voice call as well as any future calls. Over time, a rich history of all past interactions is obtained and is readily available to both parties to further enrich the long-term relationship between the parties.

Figure 4:
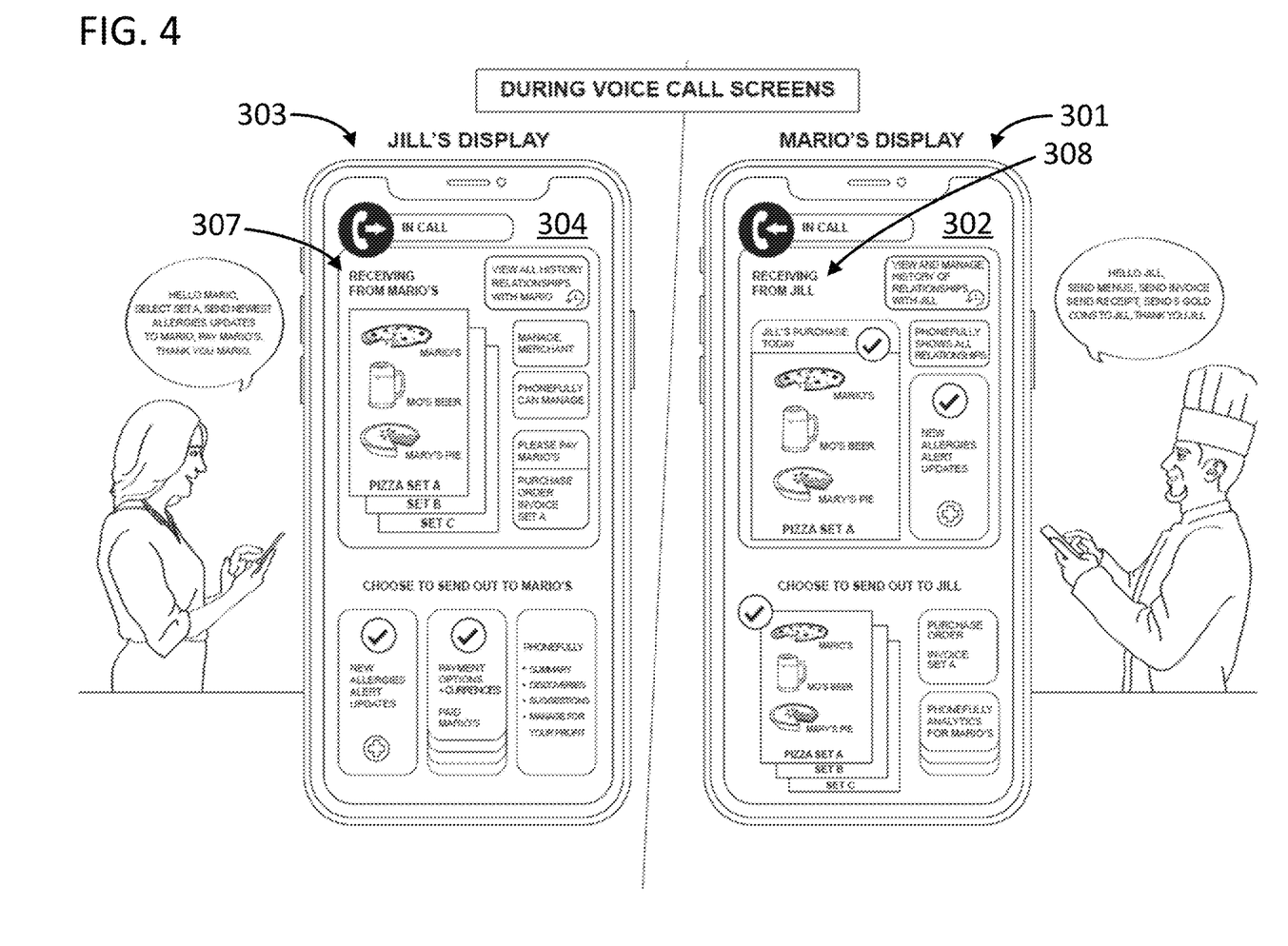
FIG. 4 illustrates the devices of FIG. 3 displaying information, during a voice call and after receiving new content from the server, in accordance with specific embodiments of the present invention.
Figure 5:
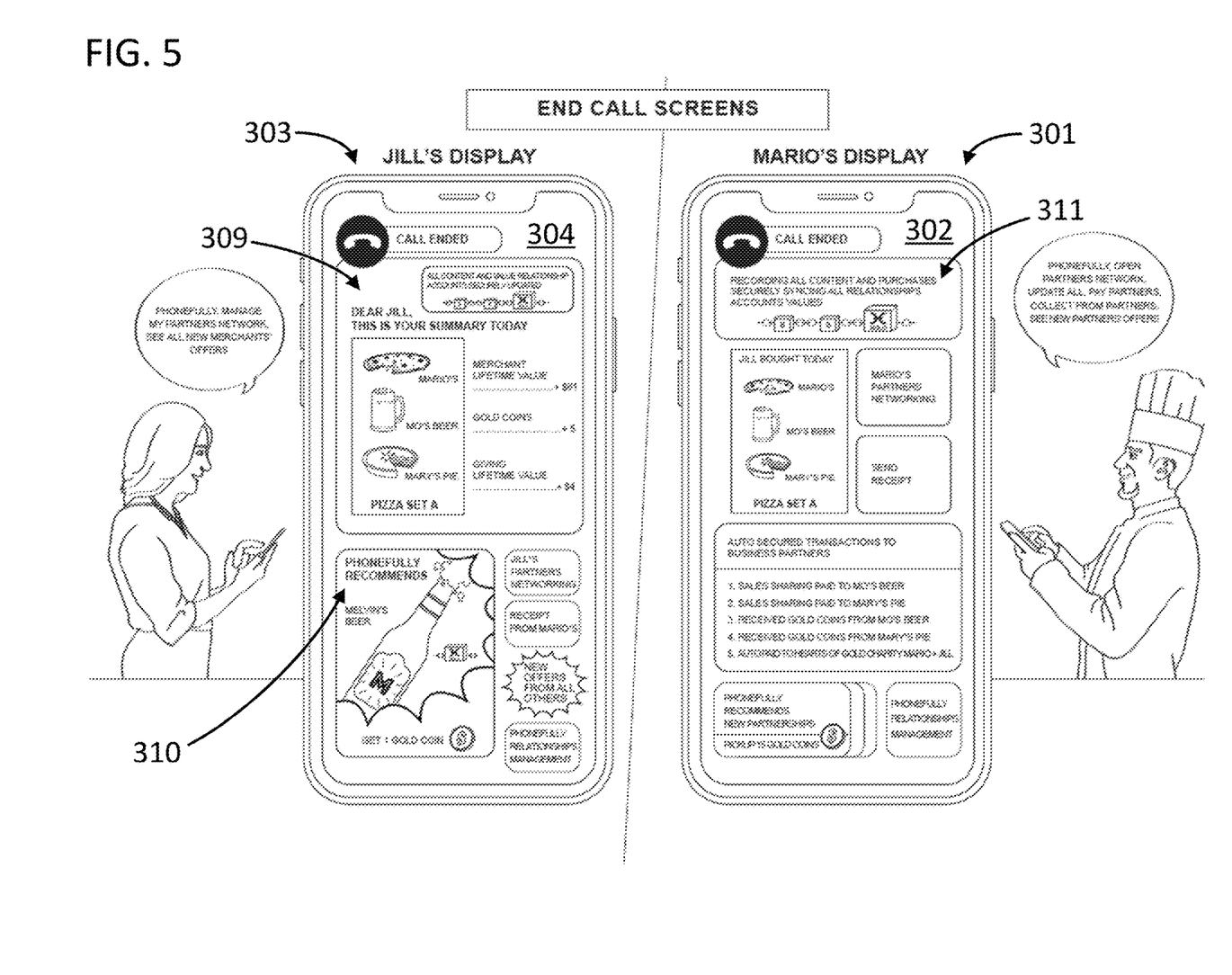
FIG. 5 illustrates the devices of FIG. 3 displaying information, during the end of a voice call and after receiving new content from the server, in accordance with specific embodiments of the present invention.

In the example of Jill and Mario, Mario could use the table to present coupons or deals to Jill in real time as Mario took Jill's order. Mario would also be able to pull information from the database concerning Jill such as the upcoming anniversary of a special event that she previously reserved a table for in order to offer her the opportunity to celebrate at Mario's again this year. Jill could also request additional information such as a picture of the inside of the restaurant's new exclusive private room for large parties, which Mario could provide in real time during their call. The data channel could also be used for Mario to provide Jill with a coupon for her next order at the conclusion of their call where an image of the coupon was provided to Jill's phone in the form of interaction data and stored in the database for later use by Jill the next time she called Mario. The data channel could also be used to provide platform wide incentives such as a specialized currency that can be used across all vendors that participate in the platform. As shown in FIG. 4, during a voice call and after receiving new content from the server 104, the display 304 on Jill's phone can show receiver device receiving information 307 which shows, for example, that Mario had prepared a food order to be received by Jill according to her preferences. The display 302 on Mario's phone can show dialer device receiving information 308 which shows, in the same example, that Jill confirmed her food purchase. As shown in FIG. 5, during the end of a voice call and after receiving new content from the server 104, the devices can show additional messages. Nonlimiting examples of such additional messages can be summary messages 309, recommendation messages 310, and data synchronization messages 311.

Figure 6:
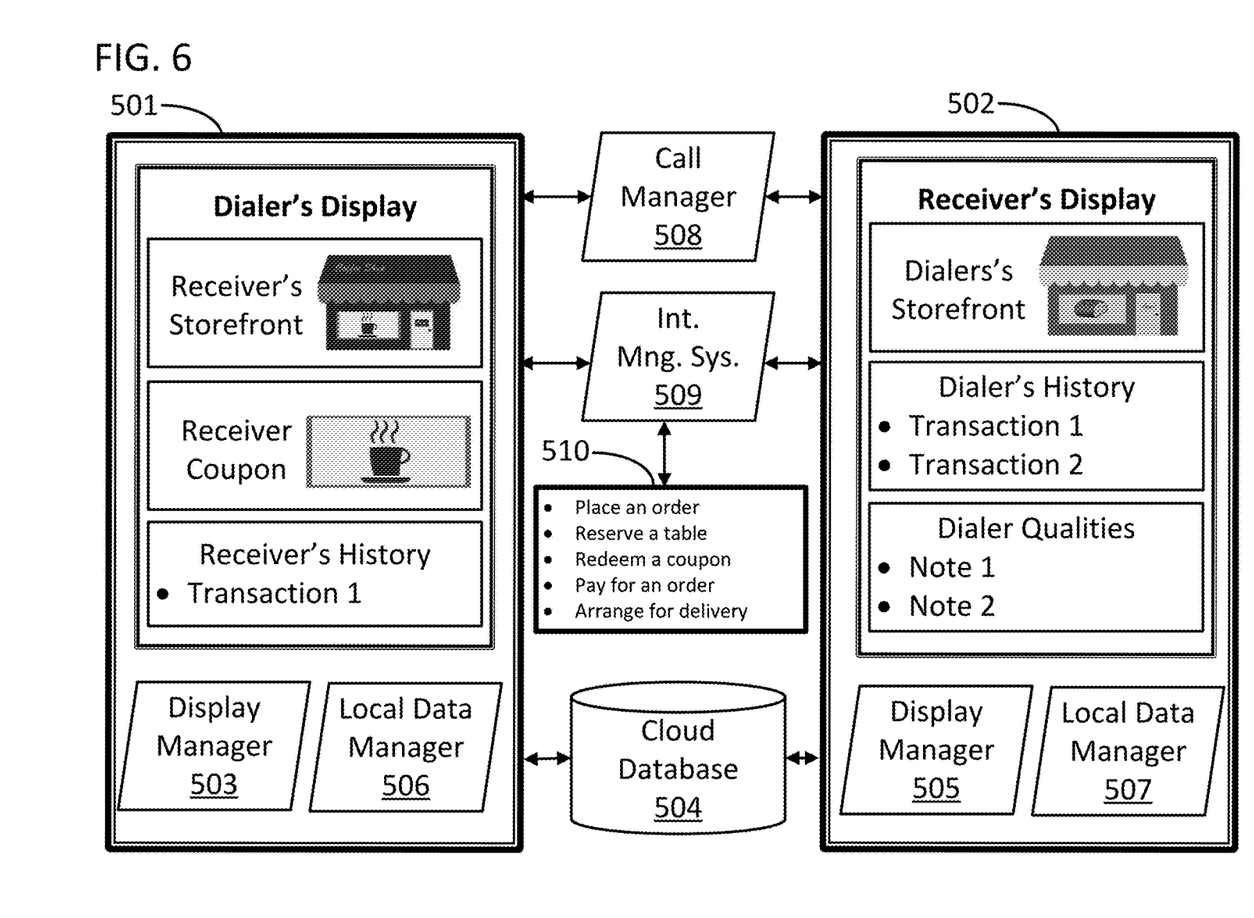
FIG. 6 provides a flow chart and block diagram for a method for use of the system of FIG. 1 in accordance with specific embodiments of the present invention.

As described in a system diagram provided by FIG. 6, the dialer device 501 with a dialer and the receiver device 502 could include additional software elements to help facilitate the functioning of the commercial data platform. For example, each device could include a display manager and a database. In one example shown in FIG. 6, the dialer device 501 can have a display manager 503 and be connected to a cloud database 504, and the receiver device 502 can have display manager 505 and be connected to the same cloud database 504. The display managers 503 and 505 could continuously receive content from all data sources in the platform and display content based on the configuration of the device owner's account with the platform. Display managers 503 and 505 perform local display management functions for the devices on which they are installed. A cloud database 504 can include the qualities and function of a local database, a platform database, and other database configurations that can be used with the commercial data platform. The display managers 503 and 505 could work in combination with the interaction manager to request data from the cloud database 504, and filter data delivered from the server before that data was presented on the device. For example, the interaction manager could indicate that a user was being provided with a set of gold coins, and the display manager 503 could select a particular image from the cloud database 504 that the user had selected to represent those coins. The display managers 503 and 505 could be programmed to generate display content for displays on the devices 501 and 502 using the interaction data from the cloud database 504. For example, the interaction data could include a sale offer generated by a receiver for delivery to the dialer device 501 through the database and server while the display content constituted an image used to make the sale offer visually appealing. The image could be stored in the cloud database 504 in association with the receiver's phone number and/or unique identifier. The display managers 503 and 505 could generally format content provided by the interaction manager for the displays on the respective devices 501 and 502. As such, the development effort associated with cross platform implementation could be lessened as the display managers 503 and 505 could be more heavily altered while the interaction manager stayed relatively stable with different implementations. The cloud database 504 could be managed by a local database manager locally installed on the system devices. For example, the dialer device 501 could have a local database manager 506 and the receiver device 502 could have a local database manager 507. Alternatively, system devices can have a local database element installed thereon, enabling local data storage on each device. Devices with a local database can operate independently or in concert with a cloud database 504 as part of a database network and can be managed by the local database managers of the respective devices, such as local database managers 506 and 507. The dialer device 501 local database manager 506 could be programmed to obtain data from interaction data regarding past interactions between a specific dialer and receiver whenever the dialer initiates a new call between the dialer device 501 and the receiver device 502. Past interactions stored in a database could include a transaction history of, or notes about, the communicating party, as shown on the example device displays illustrated in FIG. 6. The cloud database 504 could also be used to limit the amount of traffic on the network between the server and the dialer device 501 by storing data that was frequently accessed by the display manager 503 on a particular device. For example, if Jill was a regular customer of Mario's, then Mario's logo could be stored on Jill's device for retrieval every time her phone loaded Mario's profile. The local database manager could assure that certain dialer, receiver, or interaction content data persisted on the device between interactions for this purpose.

The user interface presented to the user could take on numerous forms. The user interface can display controls and information for the data and voice channels separately or simultaneously. The data channel interface could be shown alongside a dialer application and be provided by a separate application, or the dialer application could include an integrated window for the data channel interface. The data channel interface could be a screen overwrite, or screen overlay, inside, as part of, or on the dialer application screen normally unused and unchanging during the call duration, for the data channel interface. The dialer application screen could be the call screen of a built-in dialer application on the dialer device 501 and could display standard controls such as an end call button or a mute button. In the specific example of the data channel being administrated by a separate platform application that works in combination with a separate dialer, the platform application could present sufficient controls for handling both the data channel and the voice channel. For example, after intercepting the call, the voice channel would remain open, and the platform application would completely overlay the screen and display a user interface with the data channel where the interactive data content will appear without the need to switch to an outside additional application. Controls such as "mute" and "speaker phone" would now be available within the same user interface, and there would be no need to return to the original dialer application interface. If at any time during the call, the user would like to return to the original dialer application interface that initiated the call, the user could hit an icon on the user interface and return to the original dialer screen.

The devices used in combination with the platform could also include a real-time interaction manager and call manager 508. The call manager 508 could support continuation of a voice call, and the voice call itself, allowing the users to access the dialer and phone controls as needed. The call manager 508 could also support the voice channel independently of the data channel. The real-time interaction manager could continuously manage the interactions between a caller and receiver to make sure that all their interactions are logged in the cloud database 504. The real-time interaction manager could write and read data to and from the cloud database 504 and third-party external databases. The two components together could support the simultaneous use of multiple devices for the voice and data channel. The interaction manager could also manage and store all interaction threads 510 and activities during an ongoing communication over the data channel. The real-time interaction manager could include software stored on either device, including the interaction managers mentioned above, as well as software on the server of the platform. The interaction managers could manage at least two interaction threads 510 between the dialer device and the receiver device and would likely manage many more depending upon the level of interactivity provided over the data channel. Alternatively and with respect to the embodiments described above, the functions of the interaction manager and the real-time interaction manager can be implemented in the commercial data platform system by an interaction management system 509. The interaction management system 509 can be operated remotely using a cloud-based system, and can be in communicative connection with both the dialer device 501 and the receiver device 502 to perform the interaction manager functions for both devices.

The software modules and components on the devices involved with the data channel that are described above, such as the display managers 503 and 505 and interaction manager, could be administrated by a single application or multiple applications. In addition, the dialer and call manager 508 that are involved with the voice channel could be administrated by a single application or multiple applications. Furthermore, the components associated with either channel could be administrated by a single application or multiple applications. In one approach, a single application provided by the platform administrator and stored on a device, such as a dialer's smartphone, could include an integrated dialer such that the application both initiated a phone call, alerted the platform to open the data channel, and administrated both channels during the call. The dialer, as a module of that application, could be programmed to receive the receiver phone number and/or other unique identifier prior to initiating the call and transmit the receiver phone number and/or other unique identifier to the server for purposes of obtaining receiver content for display to the dialer, and setting up the data channel. In another approach, two separate applications could be involved with dialing and communicating with the platform. The dialer could be a built-in dialer application on a smartphone operating system. The dialer could alternatively be a module in another third-party application installed on a smartphone or other computing device's operating system such as an integrated dialer in a social networking application. In a smartphone implementation, the separate application used to intercept the receiver phone number and/or unique identifier on behalf of the platform could be another application on the smartphone operating system with read phone state permission. The separate application could then receive a broadcast indicating that the dialer was initiating a call, obtain the receiver phone number from the broadcast, and transmit the receiver phone number and/or other unique identifier to the server. In either case, the application that is used to pass the receiver phone number and/or other unique identifier to the platform could be provided by the platform administrator through a network content distribution system such as an application store.

The applications could be installed and maintained on the user's devices. In one scenario, a potential user downloads the platform application to their mobile device and installs the application. At the same time the user could configure their mobile device to receive upgrades to the application over time. The user could then configure their platform application such as by setting their profile, customizing a storefront, configuring which profiles are shown to which users, and other options. The user can invite other users to join the platform by sending invitations out from within the application interface. The user can provide a command to send an invitation to specific people such as via the entry of their phone numbers in the application. The platform would then send out text messages to those users with a link to download the application.

Another way to invite users to join the platform is to simply call them. A user does not need to have the platform application installed to receive a call from a user who is. The receiver can receive a call in the same way that they always do, and can then be invited to join the platform while on the call. However, the application on the dialer device could receive a response from the platform that the receiver was not yet in the system. A user interface element could then be presented on the display of the dialer device, possibly alongside a temporary profile for the receiver that was generated dynamically, informing the dialer that they can invite the receiver. Upon selection of this user interface element, the platform could send a text message to the receiver device with a link to download the platform application. The dialer could be incentivized to invite the receiver through the use of incentives such as currency with the platform, coupons, or other incentives. The platform could customize the incentive and display it alongside the user interface element based on an identity of the receiver or dialer. To assure adoption, the dialer could be provided with an auditory queue over the phone to indicate that the receiver had indeed either received the text message, or installed the application on their device. The auditory queue could be provided over the voice channel to assure that both the dialer and receiver could hear when the receiver took steps to join the platform.

The commercial data platform can, as mentioned above, be made extensible via access to additional source of data such as third-party databases. Furthermore, the commercial data platform can be made extensible through the use of APIs used to interact with entirely separate platforms. In one particular example, the platform database can be used as a source of truth for an external incentives platform. The real-time interaction manager of the commercial data platform can be used to synchronize certain portions of the commercial data platforms database with an external database through the use of APIs. One type of synchronizing API can be distributed ledger technology. Distributed ledgers can comprise data sets that are stored and synchronized over multiple storage locations. Distributed ledgers and, equivalently, the data of which a distributed ledger is comprised, can be stored on a network of devices called a distributed ledger network. One example of distributed ledger data can be a set of ledger tables for an incentives platform where vendors and customers are able to exchange coins or cards for goods and services. Another example of distributed ledger data can be a first set of interaction data and a second set of interaction data that form a commercial transaction and are stored in association with the two parties to the transaction. For example, the first and second sets of interaction data can comprise a purchase order and an invoice. Interactions taking place on the commercial data platform can involve these external incentives platforms in the sense that data can be taken from those external platforms or pushed to those external platforms. In this situation, a customer is rewarded with an incentive from a seller for referring another customer to the seller. All of the many interactions associated with that set of transactions are facilitated and recorded by the commercial data platform and are used to update the external incentives platform. Therefore, through the use of APIs and the real-time interaction manager any number of external services can be added as services to the commercial data platform essentially mining the data from all of the interactions that occur on that platform into a single frictionless system that ensures full commercial trackability and traceability as to which vendor, merchant and referring customer added value to the chain of interactions to be compensated with agreed rewards payable for example in gold coins and accruable incentives.

One class of external databases that can be accessed by the commercial data platform are those associated with advertisers. The commercial data platform can interact with these external databases using the interaction data harvested by the platform in order to provide useful advertisements and offers to the participants of the platform. Since the interaction data will include information regarding the purchases, purchase decision processes and substitutes available during those decisions, as well as other areas of interest of the platform participants, a rich picture of the platform participant as a purchaser can be developed. This data can be kept isolated by the commercial data platform and used to request or authorize the entry of advertisements from external databases without allowing the advertisers access to the stored data to ensure user privacy. Given the rich amount of data available to profile a purchaser, and the fact that the purchaser is likely already engaged in commerce when using the system, the advertisers can pay strictly for sales originating from advertisements drawn into the platform. Alternatively, the external database can be accessed using ad criteria that has been supplied from the platform using attributes such as, for example, the type of business being called and or attributes about the dialer and/or receiver, and/or any other attributes that may be useful to serve an appropriate ad.

In a specific embodiment of the invention, a server in the system is programmed to obtain interaction data using a dialer identifier and a receiver identifier after a dialer has initiated a call with a receiver. The server is also programmed to analyze the set of interaction data and obtain external content from an external database based on the analyzing of the interaction data. A display manager stored on the dialer device can then generate, during the call, display content for a display of the dialer device using at least a portion of the external content. The external content can be advertising content and the analyzing of the interaction data can comprise determining a degree of interest in the advertising content based on the interaction data. Certain embodiments in accordance with this disclosure exhibit certain benefits in that the call screen of a standard call using a smartphone includes unused real estate that can now be put to use by providing interesting offers to a user. Furthermore, the interaction data associated with both the dialer and receiver is usefully harvested for determining a degree of interest in advertising material because the particulars of the commercial situation that lead to the creation of that interaction data is highly likely to apply to the current call as well. For example, if the interaction data shows that a user is likely to purchase a specific soda when ordering a given type of food, advertisements for a promotion for a close substitute to that specific soda are likely to have a greater impact if delivered during the call because the purchaser is already considering their desire for that product. In this way, prior interaction data serves to create, not just a good profile of a purchaser's interests in general, but a highly tuned profile of that purchaser's interests in a situation that they currently find themselves in.

The Simultaneous Voice and Data Content Driven Commercial Data Platform will track, to the greatest level of detail possible, the comprehensive set of all interactions that occur between the numerous entities transacting business, including interactions between networks of entities and themselves or other entities, in a reliable, secure, and above all trusted manner. Supporting these transactions, and any incentives and rewards system, will require support for any number of currencies including traditional country specific currencies, a platform proprietary currency, and any accepted externally recognized cryptocurrencies. The Commercial Data Platform will facilitate these currencies' inter-convertibility, for example through a series of sequential debit and credit transactions using different currencies, and act as a currency exchange. Currencies usable with the Commercial Data Platform can include stored bank account funds backed by various national entities in the global banking system, cryptocurrency funds, and credit card funds. The ledger of transactions representing all transactions, regardless of currency, must be tamper-proof and, therefore, the Commercial Data Platform will make full use of the repertoire of any current or future mechanisms, systems, processes, and technologies to construct and insure ongoing trusted, secure, scalable, and protected Commercial data platform integrity comprising of, but not limited to, the use of technologies such as a Distributed Ledger Technology (DLT) like Blockchain and Holochain.

Through the use of the commercial data platform and techniques described above, a multitude of opportunities for enhanced consumer-to-consumer (C2C), business-to-consumer (B2C), and business-to-business (B2B) commercial relationships are created. The flow of data between parties both enriches the current interactions from which that data is being mined and future interactions between the parties as they build stronger ties and commercial relationships. To further this goal, the data can be mined and further processed with big data analytics, artificial intelligence, natural language processing (NLP) machine learning, deep learning and deep artificial neural networks. These benefits are described below in multiple scenarios to illustrate some of the rich content and interactivity that the commercial data platform provides. The scenarios can, at a top level, be broken down between two sets of scenarios. In one set of scenarios, the dialer interacts with the receiver using both the voice and data channels described above. In the other set of scenarios, the dialer interacts with the receiver using only the data channels. The scenarios are specific examples of the use of a system in accordance with this disclosure and are not meant to limit the scope of the appended claims. Phonefully is provided as an example of a simultaneous voice and data content driven commercial data platform, the Phonefully proprietary data store (PPDS) is provided as an example of the database of the simultaneous voice and data content driven commercial data platform, the Phonefully App is provided as an example of a platform application, the caller is provided as an example of a customer-dialer, and Mario is provided as an example of a vendor-receiver.

The data produced by the Simultaneous Voice and Data Content Driven Commercial Data Platforms disclosed herein and stored in the ledger of the platform will contain an intricate and detailed web of information concerning all of the commercial interactions of the various market actors within, or on the periphery of, the commercial data platform. In embodiments of the invention mentioned above in which a currency is made for usage outside the commercial data platform, but whose usage data is either traced in a distributed ledger or otherwise made available to the commercial data platform, any usage of the currency will likewise add to the level of information provided by this web. This data will be ripe for mining and synthesizing, such as with artificial intelligence, to provide all market actors with information regarding the broader impact of their commercial decisions on the overall market that lies within the web of information. The data will include not only what a customer purchased or a seller sold, but what other options the transaction participants considered when making their decisions, what incentives were sufficient to drive a purchasing decision, or even what amount of time a party took to reach a decision on spending. The data can also be combined with data accessed from external sources, as described above, including external economic market content. All this data can be synthesized, such as with artificial intelligence, into a more complete picture of the forces of supply and demand at work in the relevant market.

Adam Smith once said that the economy functions according to an "invisible hand" which guides the selfish acts of individual market actors towards the production of social benefit. However, the invisible hand and reliance on the selfish acts of individual market actors to provide social good was an unavoidable aspect of Adam Smith's vision—not a laudable feature. Today, there is no reason to keep the hand invisible when you have access to vast troves of data, analyzed and synthesized using big data techniques and artificial intelligence, that reveal the flow of commerce between all actors in an economy and their preferences, nor is there any reason to rely solely on the selfish acts of individual market actors when there is ample evidence that people do wish to make the world as a whole better with their choices even if they derive no material benefit from doing so. Both these improvements to the traditional operation of a market economy can be made through the use of the systems disclosed herein. As the CRMs we have described include massive amounts of data regarding all of the commercial transaction conducted by an individual, and also provide a liquid channel for feeding back a synthesized version of that data to individual market actors, those market actors can see the impact of their commercial decisions and be empowered to make choices that improve the economy and world as a whole.

In specific embodiments of the invention disclosed herein, the CRM is used as a system for the improvement of social good through intelligent informed interactive C2C, C2B, B2C, and B2B commerce. Various implementations of the CRM can provide these benefits in various ways including storing and analyzing the mass of interaction data using Blockchain technology to package the data in such a way that the chain of relationships and interactions is readily accessible and cryptographically encoded in each block of data utilized by the system, packaging and presenting the information to users in a manner that gamifies and incentivizes social betterment, as will be described immediately below, and providing the system with an embodied representative of the CRM itself in the form of an avatar that can encourage users to take actions that contribute to social welfare as opposed to their own direct personal benefit. With specific regard to Blockchain, and as described above, the CRM would benefit from employing and harnessing Blockchain to track, report on, and proactively present how a user's transactions and relationships choices through histories of relationships, exchanges, interactions, and transactions have affected the system as a whole, and the outside world, as opposed to just providing an account statement for the user and the parties the user has interacted with directly.

In addition to the benefits noted above of synthesizing all the individual exchanges and transactions of content and payments within the CRM and displaying that synthesized information to a user, a layer of gamification can be added to the system to encourage individual market actors to maximize the level of social good they are generating with their commercial decisions. Various scoring systems and metrics can be provided to allow an individual market actor to understand the potential impact of various choices available to them. Incentives can also be provided such as in the form of sweepstakes wins or the actual issuance of commercial data platform currency in exchange for points scored. The scores and metrics can have different objectives such as favoring contributions to a local economy vs. the broader economy, decreasing income inequality, decreasing environmental harm, etc. Users can also be provided with the ability to determine which metrics they want tracked or displayed when faced with a given commercial decision. The scores and metrics can be presented to the user with respect to various commercial decisions. For example, the scores and metrics can provide a score for dealing with a specific counterparty, making a particular purchasing or selling decision relative to another, or choosing to invest money instead of spending it. The information can therefore be utilized to determine, for example, if a market participant should transact with merchant A (a local coffee shop) instead of merchant B (a global chain of coffee shops) because of the impact transacting with merchant A will have on the local economy relative to transacting with merchant B. Furthermore, the information can be used to help determine what should be purchased from merchant A, and whether a purchase in any given case produces more harm than simply abstaining.

In specific embodiments, the CRM can take on a roll similar to a gamemaster within the game system provided by the CRM and interact directly with the players. The gamemaster can be instantiated by an avatar within the system and interact directly with the various users in the system to provide them with information or encourage them to take actions that provide beneficial externalities as compared to making decisions based solely on price and benefits that are derived directly by the user. The avatar can provide the scores and metrics mentioned in the previous paragraph through voice or visual communication with the user as provided by an interaction manager or a display manager on the user's device. The scores and metrics can be presented to a user to assist them with making a decision as well as in reviewing the cumulative effects of their prior usage of the system.

Figure 7:
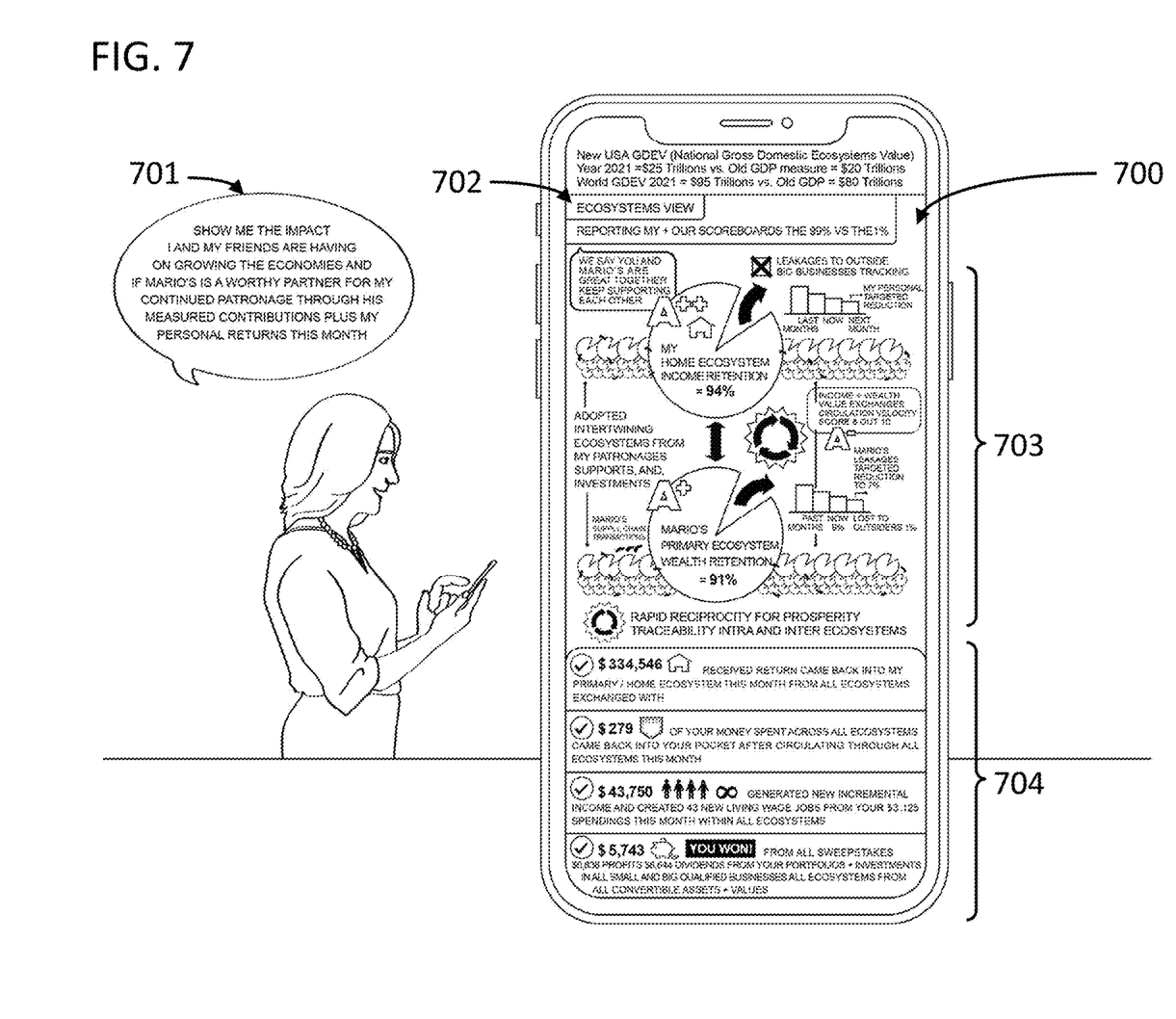
FIG. 7 illustrates the device of FIG. 3 displaying information that has been collected, aggregated, and synthesized by a commercial data platform to provide a user with visibility into the impact of their commercial decisions in accordance with specific embodiments of the present invention.

FIG. 7 illustrates the device of FIG. 3 displaying information that has been collected, aggregated, and synthesized by a commercial data platform to provide a user with visibility into the impact of their commercial decisions in accordance with specific embodiments of the present invention. In this case, display 700 has been set to display a specific metric in response to a voice command 701. In response to receiving this command, the CRM can analyze collected interaction data along with external content such as external market content and synthesize a score value for the desired metric. In the illustrated case, analyzing the interaction data can include determining a submarket ecosystem. The metric requested by the user in this case is an ecosystem impact metric which has produced ecosystems view 702. Ecosystems view 702 includes a metric presentation section 703. The metric presentation section 703 can include various metrics such as a submarket ecosystem performance indicator generated using external economic market content and interaction data stored by the CRM. Notably, the voice command 701 also include a decision space in which to analyze the metric, because the user is interested in seeing the impact of selecting Mario as a commercial counterparty. As illustrated, Mario is a good counterparty to select for the ecosystem metric as Mario, and the people Mario enters into transactions with, etc. tend to utilize their money in a way that benefits the users home ecosystem. Display 700 also includes a notification section 704 which provides specific additional notifications regarding the currently displayed metric, progress regarding the gamified aspects of the CRM generally, and may also include, as illustrated, notifications regarding other metrics in a bid to entice the user to consider those also. As illustrated, the user is presented with a notification regarding the number of living wage jobs created by the commercial decisions made using the CRM, which might become a metric the user begins to track and consider when making future decisions.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be a memory within a personal user device or a network accessible memory. These and other modifications and variations to the present invention may be practiced by those skilled in the art, without departing from the scope of the present invention, which is more particularly set forth in the appended claims.

What is claimed is:

1. A system comprising:
a dialer device with a dialer identifier;
a receiver device with a receiver identifier;
a dialer that is programmed to initiate a call between the dialer device and the receiver device using the receiver identifier;
a database;
a server, wherein the server is programmed to:
obtain a set of interaction data from the database using both: (i) the dialer identifier; and (ii) the receiver identifier;
analyze the set of interaction data;
obtain external content from an external database based on the analyzing of the set of interaction data; and
a display manager: (i) stored on the dialer device; and (ii) programmed to generate, during the call, display content for a display of the dialer device using at least a portion of the external content.

2. The system of claim 1, wherein:
the external content is advertising content; and
the analyzing of the set of interaction data comprises determining a degree of interest in the advertising content based on the set of interaction data.

3. The system of claim 1, further comprising:
a first interaction manager: (i) stored on the dialer device; and (ii) programmed to transmit a first set of interaction data to the database during the call; and
a second interaction manager: (i) stored on the receiver device; and (ii) programmed to transmit a second set of interaction data to the database during the call;
wherein the server is programmed to:
obtain receiver content data from the database using the receiver identifier;
transmit the receiver content data to the dialer device;
obtain dialer content data from the database;
transmit the dialer content data to the receiver device; and
store data from both the first set of interaction data and the second set of interaction data in the database in association with both the receiver identifier and the dialer identifier.

4. The system of claim 3, further comprising:
a distributed ledger on a distributed ledger network;
wherein the server is communicatively connected to the distributed ledger network; and
wherein the distributed ledger includes the first set of interaction data and the second set of interaction data in association with both the receiver identifier and the dialer identifier using the server and distributed ledger technology.

5. The system of claim 3, wherein:
the first set of interaction data comprises a purchase order;
the second set of interaction data comprises an invoice; and
the server is programmed to: (i) obtain the purchase order from the database; (ii) obtain the invoice from the database; and (iii) generate a payment processing request using the purchase order and the invoice.

6. The system of claim 3, wherein the server is further programmed to:
transmit at least a portion of the first set of interaction data to the receiver device during the call; and
transmit at least a portion of the second set of interaction data to the dialer device during the call.

7. The system of claim 3, further comprising:
a local database stored on the dialer device; and
a local database manager: (i) stored on the dialer device; and (ii) programmed to obtain data from both the first set of interaction data and the second set of interaction data in the database when the dialer initiates a new call between the dialer device and the receiver device.

8. The system of claim 3, further comprising:
a display manager: (i) stored on the dialer device; and (ii) programmed to generate display content for a display of the dialer device using at least a portion of the second set of interaction data.

9. The system of claim 3, wherein:
the portion of the first set of interaction data includes a purchaser order and a receipt generated on the dialer device for delivery to the receiver device.

10. The system of claim 3, wherein:
the server is programmed to: (i) obtain prior interaction data from the database using the dialer identifier; and (ii) transmit prior interaction data to the receiver device;
the display manager is programmed to generate past interaction display content for the display of the receiver device using the prior interaction data; and
the prior interaction data is a purchaser order placed with a third party by the dialer during a prior call to the third party.

11. The system of claim 3, further comprising:
a data channel connecting the dialer device and the receiver device, wherein the first set of interaction data and the second set of interaction data are provided over the data channel;
a voice channel connecting the dialer device and the receiver device, wherein the call is provided over the voice channel;
an overlay within a dialer application screen on the dialer device;
a second overlay within a receiver application screen on the receiver device;
wherein the display content is presented on the overlay;
wherein the display manager generates controls for the data channel on the overlay;
wherein the dialer application screen is presented by the dialer device upon a formation of the voice channel and independent of a formation of the data channel; and
wherein the receiver application screen is presented by the receiver device upon the formation of the voice channel and independent of the formation of the data channel.

12. The system of claim 3, further comprising:
a first display manager: (i) stored on the dialer device; and (ii) programmed to generate display content for a display of the dialer device using at least a portion of the second set of interaction data; and
a second display manager: (i) stored on the receiver device; and (ii) programmed to generate display content for a display of the receiver device using at least a portion of the first set of interaction data.

13. The system of claim 3, wherein:
the receiver content data describes a receiver profile; and
the receiver profile includes a company name, a profile image, and an assigned valuation of a relationship with and for the dialer identifier.

14. The system of claim 3, wherein:
the server is programmed to obtain the receiver content data from the database using both the receiver identifier and the dialer identifier;
the receiver content data describes a receiver profile; and
the receiver profile is customized for the dialer.

15. The system of claim 3, wherein the server is programmed to:
identify an absence of the receiver content data in the database; and
dynamically generate the receiver content data using a web search or a third-party API using the receiver identifier.

16. The system of claim 3, wherein:
the dialer content data describes a dialer profile; and
the dialer profile includes a user name, a profile image, and an assigned valuation of a relationship with and for the receiver device.

17. The system of claim 3, wherein:
the server is programmed to obtain the receiver content data from the database using the receiver identifier and the dialer identifier;
the dialer content data describes a dialer profile; and
the dialer profile is limited using a dialer-configurable setting and a confidence level associated with the receiver device.

18. The system of claim 3, further comprising:
an application stored on the dialer device;
wherein the dialer device is a mobile phone with an operating system;
wherein the application has read phone state permission with the operating system; and
wherein the application is programmed to:
receive a broadcast indicating the dialer is initiating a call;
obtain the receiver identifier from the broadcast; and
transmit the receiver identifier to the server.

19. The system of claim 1, further comprising:
an application stored on the dialer device;
wherein the dialer device is a mobile phone;
wherein the dialer is a module of the application; and
wherein the application is programmed to:
receive the receiver identifier prior to initiating the call; and
transmit the receiver identifier to the server.

20. The system of claim 1, wherein:
the external content is economic market content;
the analyzing of the set of interaction data comprises determining a submarket ecosystem; and
the display content is a submarket ecosystem performance indicator generated using the economic market content and the set of interaction data.

* * * * *